US010623618B2

(12) United States Patent
Aihara et al.

(10) Patent No.: US 10,623,618 B2
(45) Date of Patent: Apr. 14, 2020

(54) IMAGING DEVICE, DISPLAY SYSTEM, AND IMAGING SYSTEM

(71) Applicant: Panasonic Intellectual Property Management Co., Ltd., Osaka (JP)

(72) Inventors: Masayuki Aihara, Osaka (JP); Shigenori Yatsuri, Osaka (JP); Yoshio Matsumura, Osaka (JP); Hiroyuki Shobayashi, Hyogo (JP); Katsumi Umeda, Kanagawa (JP); Nobuyuki Hirose, Kanagawa (JP); Kazuki Miyama, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/190,716

(22) Filed: Nov. 14, 2018

(65) Prior Publication Data
US 2019/0191064 A1    Jun. 20, 2019

(30) Foreign Application Priority Data

Dec. 19, 2017 (JP) .................................. 2017-242758
Sep. 13, 2018 (JP) .................................. 2018-171030

(51) Int. Cl.
*H04N 5/225* (2006.01)
*H04N 5/232* (2006.01)
(Continued)

(52) U.S. Cl.
CPC ............. *H04N 5/2254* (2013.01); *B60R 1/00* (2013.01); *G02B 7/04* (2013.01); *G02B 13/0045* (2013.01);
(Continued)

(58) Field of Classification Search
CPC .. H04N 5/2254; H04N 7/183; H04N 5/23293; H04N 5/374; H04N 5/2257;
(Continued)

(56) References Cited

U.S. PATENT DOCUMENTS

2007/0046804 A1    3/2007 Hirano et al.
2008/0266396 A1   10/2008 Stein
(Continued)

FOREIGN PATENT DOCUMENTS

DE    102013221882 A1    4/2015
JP         62-052517       3/1987
(Continued)

OTHER PUBLICATIONS

The Extended European Search Report dated Apr. 17, 2019 for the related European Patent Application No. 18210796.1.

*Primary Examiner* — Nam D Pham
(74) *Attorney, Agent, or Firm* — Renner, Otto, Boisselle & Sklar, LLP

(57) ABSTRACT

An imaging device includes an image sensor and an optical system. An imaging surface of the image sensor includes a first region including an intersection with an optical axis and a second region different from the first region. The optical system forms a subject image on the imaging surface so as to cause resolution of the first region to be higher than resolution of the second region. A relationship between a vertical view angle and resolution is different from a relationship between a horizontal view angle and resolution in the subject image.

9 Claims, 16 Drawing Sheets

(51) Int. Cl.
  *H04N 7/18*   (2006.01)
  *G02B 7/04*   (2006.01)
  *B60R 1/00*   (2006.01)
  *G02B 13/00*  (2006.01)
  *H04N 5/374*  (2011.01)

(52) U.S. Cl.
  CPC ....... *H04N 5/2257* (2013.01); *H04N 5/23293* (2013.01); *H04N 7/183* (2013.01); *B60R 2300/8066* (2013.01); *H04N 5/374* (2013.01)

(58) Field of Classification Search
  CPC ..... B60R 1/00; B60R 2300/8066; G02B 7/04; G02B 13/0045
  See application file for complete search history.

(56) References Cited

U.S. PATENT DOCUMENTS

| | | | |
|---|---|---|---|
| 2014/0247358 A1 | 9/2014 | Takeda et al. | |
| 2014/0293057 A1 | 10/2014 | Wierich | |
| 2017/0264843 A1* | 9/2017 | Zhou | H04N 5/3696 |

FOREIGN PATENT DOCUMENTS

| | | |
|---|---|---|
| JP | 2007-043392 A | 2/2007 |
| JP | 2007-067677 | 3/2007 |
| JP | 2014-126918 | 7/2014 |
| JP | 2016-126254 A | 7/2016 |

\* cited by examiner

IMAGING DEVICE, DISPLAY SYSTEM, AND IMAGING SYSTEM

BACKGROUND

1. Technical Field

The present disclosure relates to an imaging device that captures an image of a subject, and a display system and an imaging system that use the imaging device.

2. Description of the Related Art

Unexamined Japanese Patent Publication No. 2014-126918 (PTL1) discloses a camera module that is mounted on a vehicle to output an image around the vehicle to a display unit. The camera module disclosed in PTL1 includes an imaging unit that captures a surrounding environment of the vehicle, an image generation unit that processes a first image captured by the imaging unit to generate a second image, and a control unit that outputs the second image to the display unit when the vehicle moves forward or stops and outputs the first image to the display unit when the vehicle reverses. The control unit recognizes moving forward, stopping, and reversing of the vehicle based on images captured by the imaging unit.

SUMMARY

When an image behind a vehicle is captured, it is desirable to capture the image at a wide view angle for the purpose of obtaining information as much as possible. As the view angle is increased, however, a number of pixels per unit area of an image is reduced. Consequently, it may be impossible to obtain required image quality in an important part of an image that is required for sensing. To solve such a problem, it is necessary to capture images using two imaging devices, that is, an imaging device capable of capturing images at a wide view angle and an imaging device capable of capturing images of the important part for sensing with high image quality. This brings about large-scale devices and thus the cost increases.

The present disclosure provides an imaging device that can obtain an image that has high resolution in a region at its center part, which is important for sensing, while achieving a wide view angle.

An imaging device according to a first aspect of the present disclosure includes an image sensor that includes an imaging surface on which a plurality of pixels are two-dimensionally arranged and that generates image data from a subject image formed on the imaging surface and an optical system that images a subject in a predetermined range of a vertical view angle and in a predetermined range of a horizontal view angle on the imaging surface. A number of pixels used for capturing the subject image included in a unit view angle is defined as resolution. The imaging surface includes a first region including an intersection with an optical axis and a second region different from the first region. The optical system forms the subject image on the imaging surface so as to cause resolution of the first region to be higher than resolution of the second region. A relationship between a vertical view angle and resolution is different from a relationship between a horizontal view angle and resolution in the subject image.

A display system according to the present disclosure includes the imaging device and a display that displays an image based on the image data generated by the imaging device.

An imaging system according to the present disclosure includes the imaging device and a control device that analyzes the image data generated by the imaging device.

The present disclosure provides an imaging device that can obtain an image that has high resolution in a region at its center part, which is important for sensing, while achieving a ride view angle.

DETAILED DESCRIPTION

Exemplary embodiments will be described in detail below with reference to the drawings as appropriate. However, descriptions in more detail than necessary may be omitted. For example, detailed descriptions of well-known matters and duplicate descriptions of substantially identical configurations may be omitted. This is to avoid unnecessarily redundancy in the following description, and to facilitate understanding by those skilled in the art.

Here, the inventors of the present disclosure provide the accompanying drawings and the following description such that those skilled in the art can fully understand the present disclosure, and therefore, they do not intend to restrict the subject matters of claims by the accompanying drawings and the following description.

(First Exemplary Embodiment)

[1-1. Overall Configuration]

Figure 1:
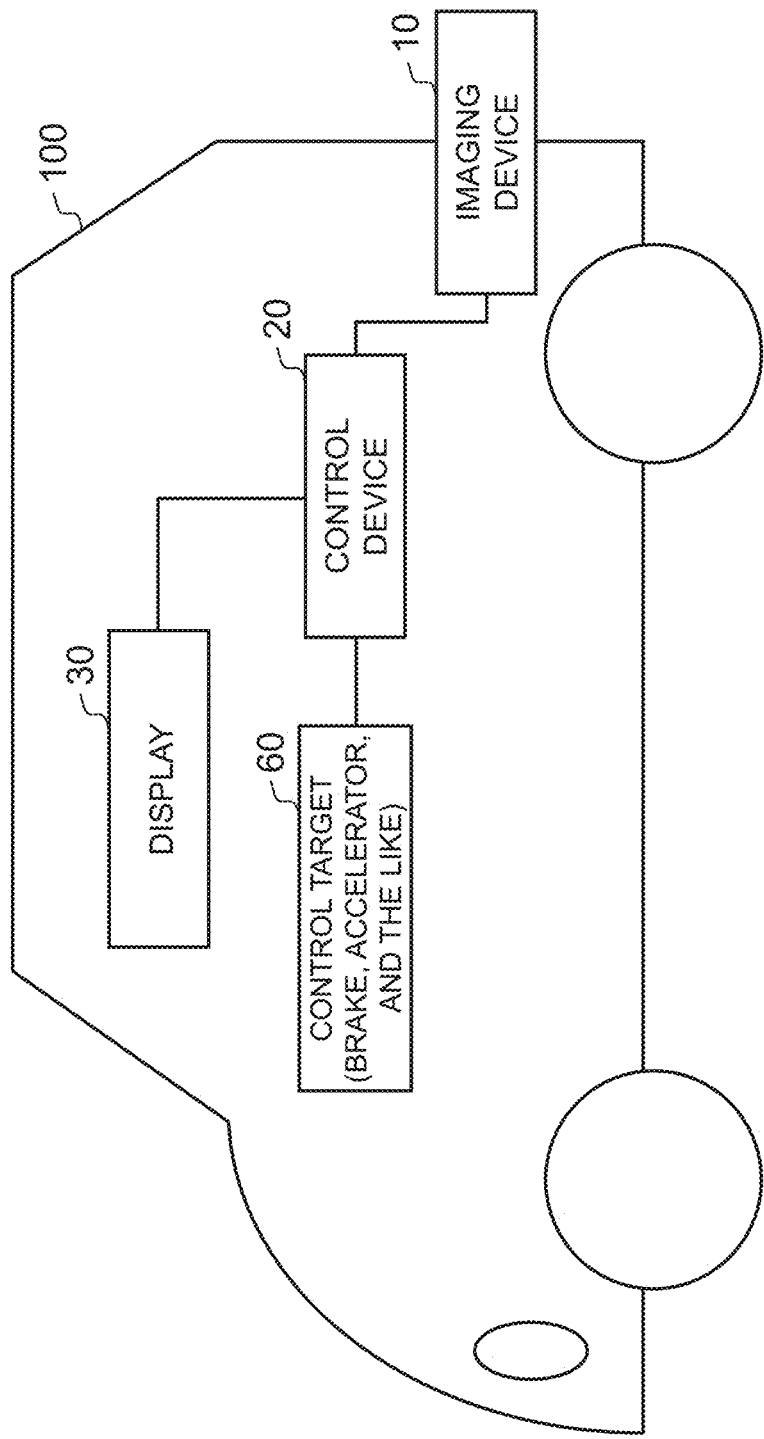
FIG. 1 shows a configuration of an imaging system, which is mounted on an automotive vehicle, according to a first exemplary embodiment of the present disclosure.

FIG. 1 shows an example of using an imaging device according to a first exemplary embodiment of the present disclosure as a rear camera for an automobile (an example of a moving body). In the example of FIG. 1, imaging device 10 captures a subject behind a vehicle to generate image data. Imaging device 10 is mounted on vehicle 100 so as to capture a scene behind the vehicle. Vehicle 100 includes control device 20 that processes the image data from imaging device 10, display 30 that displays an image based on the image data processed by control device 20, and control target 60 that is controlled by control device 20. Imaging device 10 and control device 20 constitute an imaging system. Imaging device 10 and display 30 constitute a display system. Control target 60 is at least one of a brake, an accelerator, and an alarm, for example.

Display 30 includes a display device such as a liquid crystal display panel or an organic electro luminescence (EL) display and a drive circuit for driving the display device. Display 30 is an electronic room mirror, an in-vehicle display, or the like and is capable of displaying various information (maps, route guides, radio station selections, various settings, and the like). Display 30 also displays an image of a scene behind the vehicle captured by imaging device 10 (hereinafter, "rear view image") when vehicle 100 reverses. As a driver checks the rear view image when reversing vehicle 100, the driver can grasp a situation behind the vehicle and safely reverse the vehicle.

Control device 20 receives image data from imaging device 10. Control device 20 analyzes the received image data (that is, performs image analysis on the received image data). As a result of image analysis, control device 20 recognizes an object (a person, an automobile, or other obstacles) behind the vehicle and controls control target 60 as needed. Control device 20 also performs predetermined image processing on the image data from imaging device 10 to generate image data to be displayed on display 30.

Configurations of imaging device 10 and control device 20 will be specifically described below.

[1-1-1. Control Device]

Figure 2:
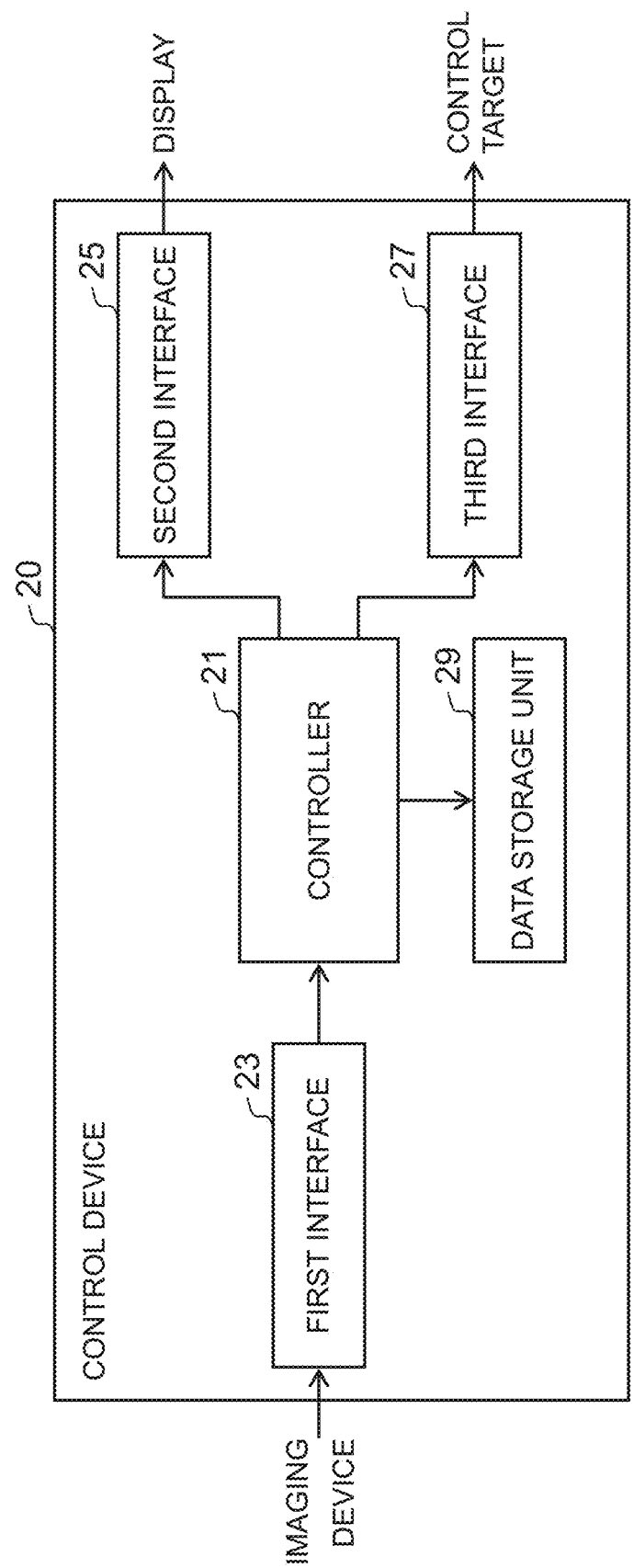
FIG. 2 shows a configuration of an image processing device in the imaging system.

FIG. 2 is a block diagram of a configuration of control device 20. Control device 20 includes first interface 23 (for example, a circuit) that inputs image data from imaging device 10, controller 21 that performs image processing and image analysis on the input image data, and data storage unit 29 that stores data and the like. Control device 20 also includes second interface 25 (for example, a circuit) that transmits the image data generated to display 30 and third interface 27 (for example, a circuit) that transmits a control signal for controlling control target 60 to control target 60.

Controller 21 includes a central processing unit (CPU) and a random access memory (RAM). As controller 21 performs programs stored in data storage unit 29, various functions are achieved. Controller 21 may include a dedicated hardware circuit designed so as to achieve desired functions. In other words, controller 21 may include the CPU, a micro processing unit (MPU), a field-programmable gate array (FPGA), a digital signal processor (DSP), or an application specific integrated circuit (ASIC), for example.

Data storage unit 29 is a recording medium such as a hard disk device, a solid state drive (SSD), or a semiconductor memory. Data storage unit 29 stores programs performed by controller 21, data, and the like.

[1-1-2. Imaging Device]

Figure 3:
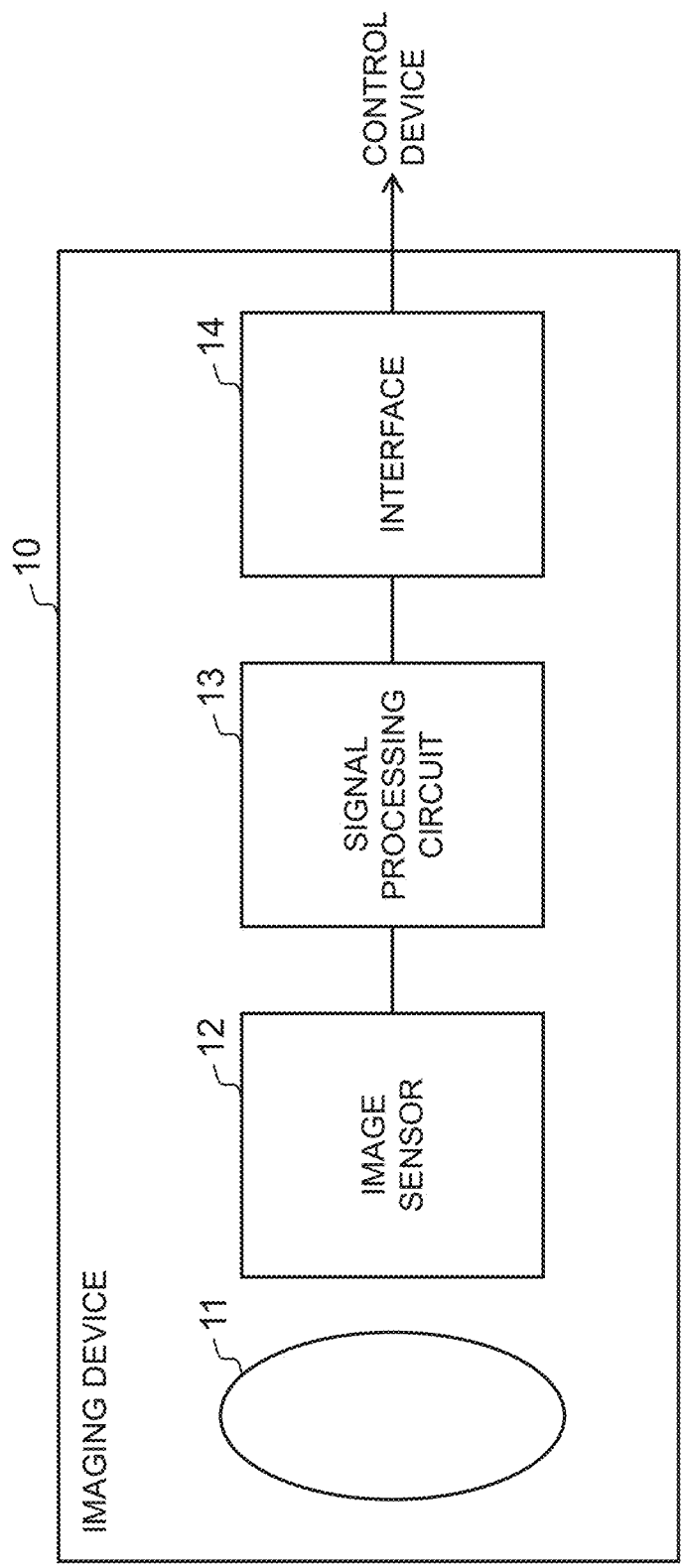
FIG. 3 shows a configuration of an imaging device in the imaging system.

FIG. 3 is a block diagram of a configuration of imaging device 10. Imaging device 10 is a camera that captures a subject to generate image data. Imaging device 10 includes optical system 11, image sensor 12 that captures a subject image generated by receiving light through optical system 11 to generate an image signal, signal processing circuit 13 that performs predetermined image processing (for example, gamma correction and distortion correction) on the image signal, and interface 14 (a circuit) that outputs the image signal processed by signal processing circuit 13 to an external apparatus.

Optical system 11 is an optical element for forming an image on an imaging surface of image sensor 12. Optical system 11 includes a lens, a diaphragm, and a filter, for example. Optical system 11 will be described later in detail. Image sensor 12 is an imaging element that converts an optical signal into an electric signal. A plurality of pixels are two-dimensionally arranged on the imaging surface of image sensor 12 at equal intervals. Image sensor 12 is a charge coupled device (CCD) image sensor, a complementary metal oxide semiconductor (CMOS) image sensor, or an n-channel metal-oxide semiconductor (NMOS) image sensor, for example.

Figure 4:
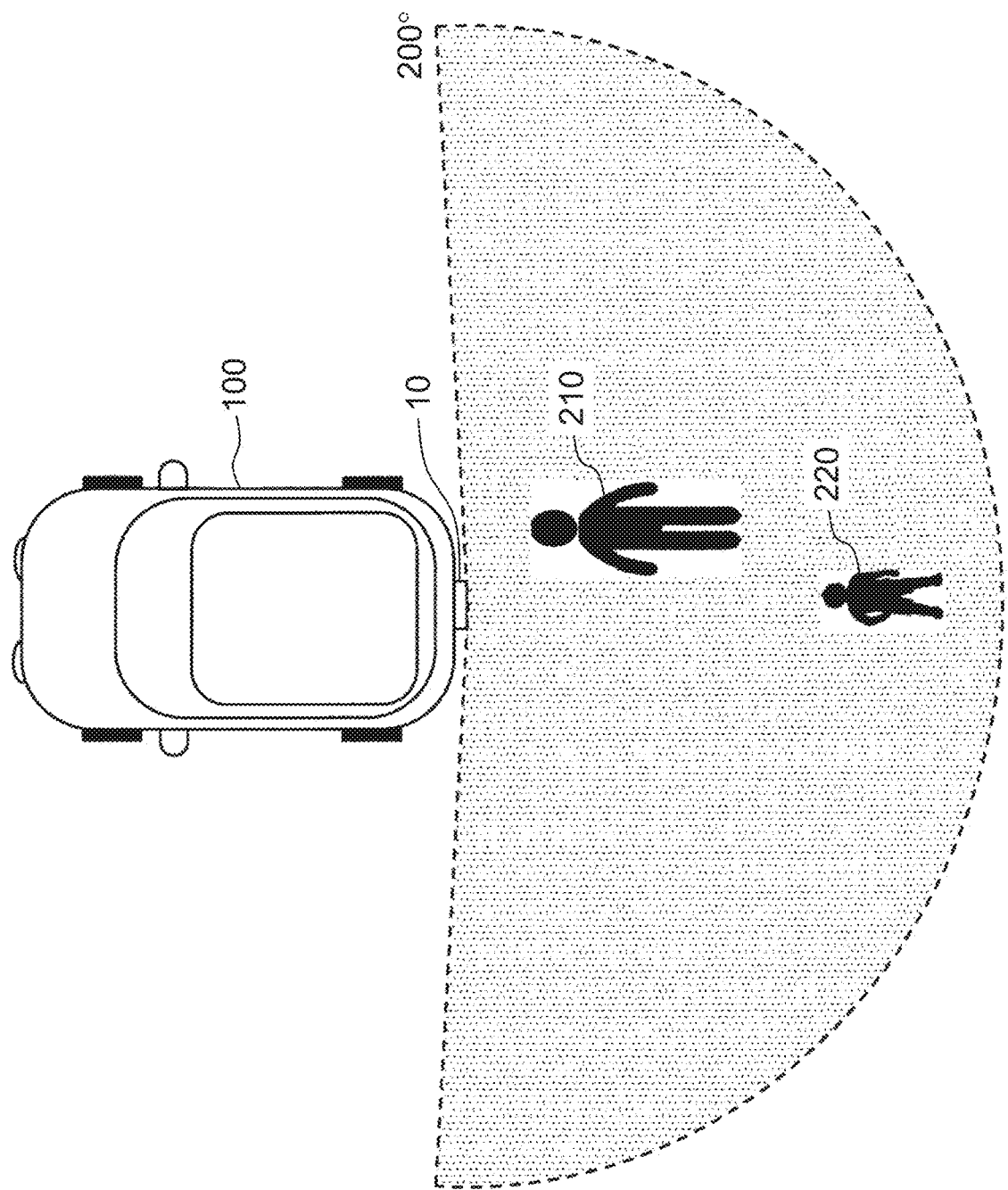
FIG. 4 is an explanatory diagram of functions of the imaging device.
Figure 5:
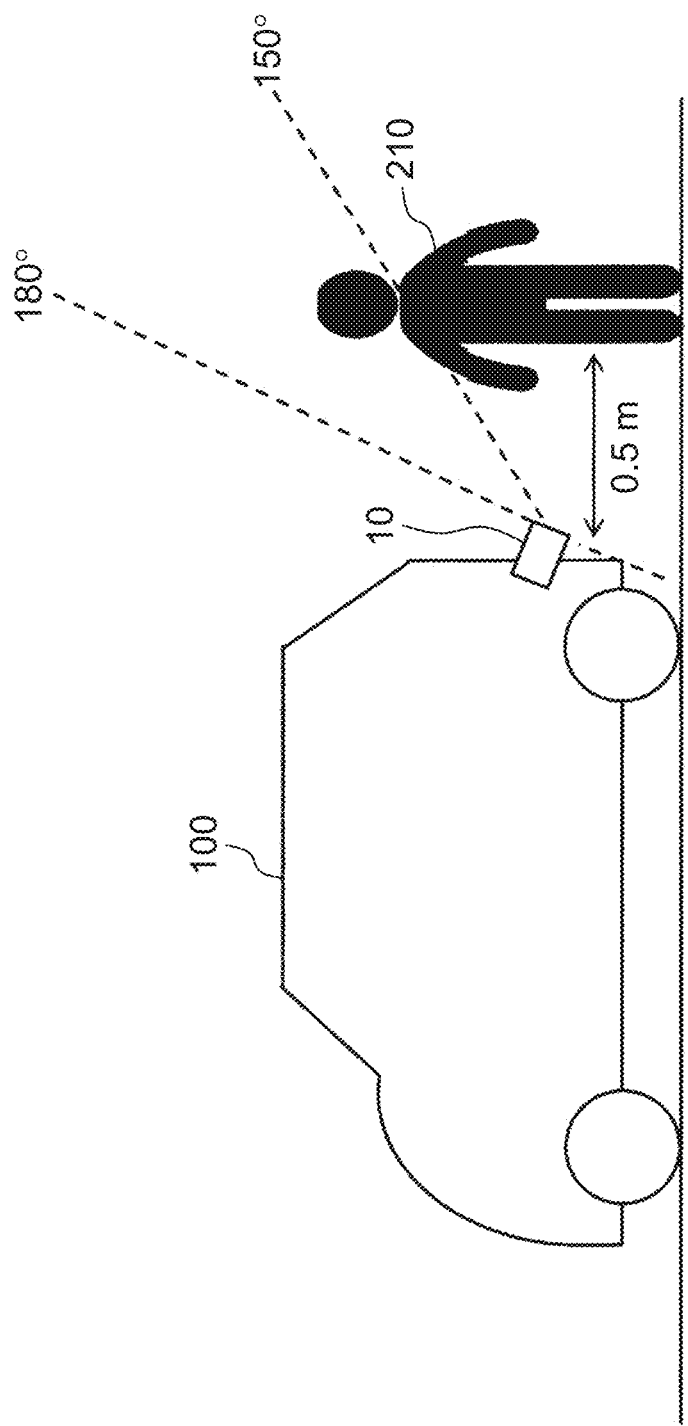
FIG. 5 is an explanatory diagram of a vertical view angle of the imaging device.

FIGS. 4 and 5 are explanatory diagrams of a range of a subject region that can be captured by imaging device 10. FIG. 4 shows a capturable range in a horizontal direction whereas FIG. 5 shows a capturable range in a vertical direction. Imaging device 10 can capture a range of 200° in the horizontal direction and a range of 180° in the vertical direction. Imaging device 10 according to the present exemplary embodiment can perform capturing at a very wide view angle. Imaging device 10 is mounted on rear of vehicle 100 (for example, a rear bumper) at a predetermined depression angle so as to face slightly vertically downward. It is thus possible to detect a subject behind the vehicle more reliably.

A description will be given of problems when an image is captured at a view angle that is large in the vertical direction. As shown in FIG. 5, in a case where person 210 is behind vehicle 100 at a close distance (for example, at a distance of 0.5 m) from vehicle 100, if the capturable range of view angle in the vertical direction is small, a part including a face of person 210 is outside the range of view angle. Consequently, the face of person 210 is not included in a captured image and the person may not be detected in image analysis based on the captured image. In particular, imaging device 10 is mounted on vehicle 100 at the depression angle, and thus if the person is present near vehicle 100, the person's face is hardly captured. It is thus considered to increase the vertical view angle of imaging device 10 for the purpose of including the part including the person's face in the range of view angle more reliably. If the vertical view angle is simply increased, however, the following problem may occur.

Figure 6:
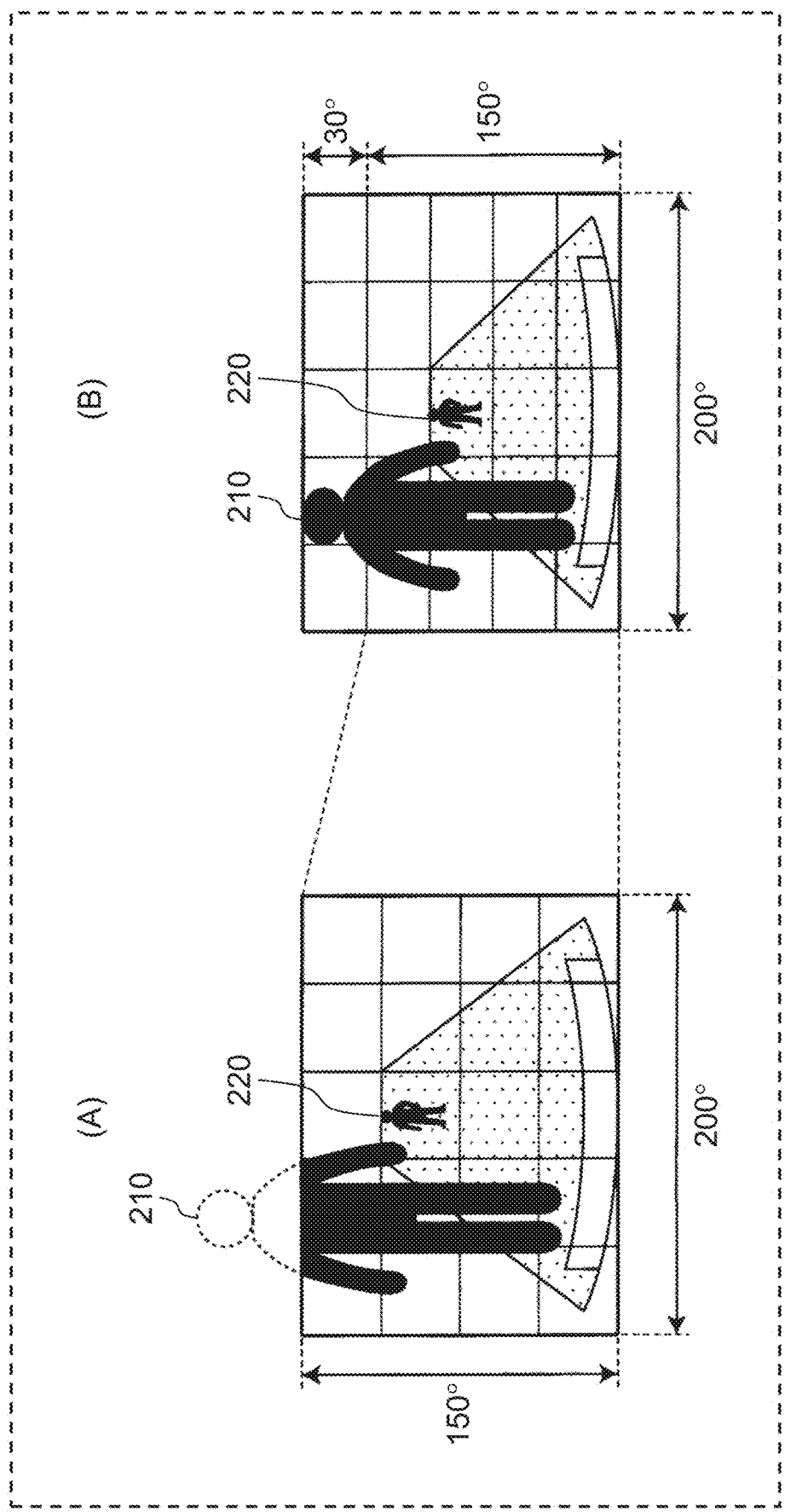
FIG. 6 is an explanatory diagram of problems solved by the present disclosure.

For example, as shown in part (A) of FIG. 6, an upper part of person 210 is outside the range of view angle at a vertical view angle of 150°. It is thus considered that the vertical view angle is increased by 30° to 180° as shown in part (B) of FIG. 6 so that the upper part of person 210 is included in the range of view angle. The upper part of person 210 above the shoulder is thus included. in the range of view angle and the face of person 210 is included in a captured image. In this case, a captured image shown in part (B) of FIG. 6 is equal in size to a captured image shown in part (A) of FIG. 6, but includes a wider subject range in the vertical direction. The vertical size of each object included in the captured image shown in part (B) of FIG. 6 is thus less than that included in the captured image shown in part (A) of FIG. 6. For example, the vertical size of person 220 far away from vehicle 100 in the captured image shown in part (B) of FIG. 6 is less than that in the captured image shown in part (A) of FIG. 6. As a result, resolution of an image of a face of person 220 is insufficient and if control device 20 performs image analysis, the face of person 220 cannot be detected. In particular, when person 220 is a small child, this problem is more serious because the face of the child is small.

Figure 7:
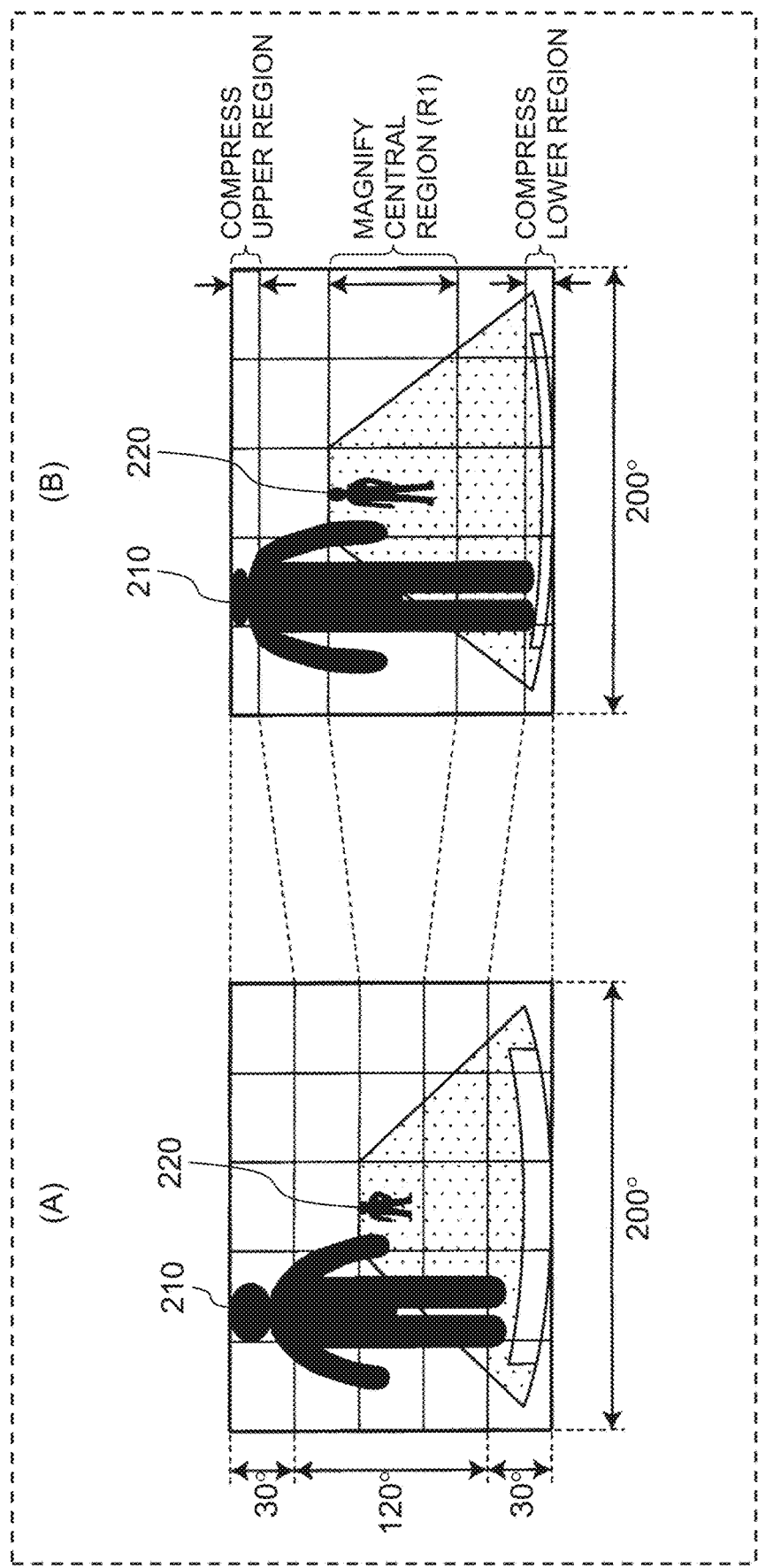
FIG. 7 is an explanatory diagram of concept of means for solving the problems.

The inventors of the present disclosure have devised an optical system that forms a subject image on image sensor 12 so as to obtain sufficient resolution of an image region of interest (for example, a center part) while increasing the vertical view angle as a whole. That is to say, the inventors of the present disclosure have devised an optical system that forms an image shown in part (B) of FIG. 7 on image sensor 12. An image shown in part (A) of FIG. 7 is the same as the image shown in part (B) of FIG. 6 and is obtained by being imaged at a uniform magnification ratio. In the image shown in part (B) of FIG. 7, the vertical view angle is 180° as in the image shown in part (A) of FIG. 7 and the same time, an image in the center part of the image is more magnified in the vertical direction and images in upper and lower end portions (in a range of view angle of 30°) are more compressed in the vertical direction as compared to the image shown in part (A) of FIG. 7. It is thus possible to obtain an image that has high resolution in a region of the center part of interest while achieving a wide view angle in the vertical direction, thus solving the problems during sensing. A configuration of optical system 11 with such optical characteristics will be specifically described below.

[1-1-2-1. Optical System]

Figure 8:
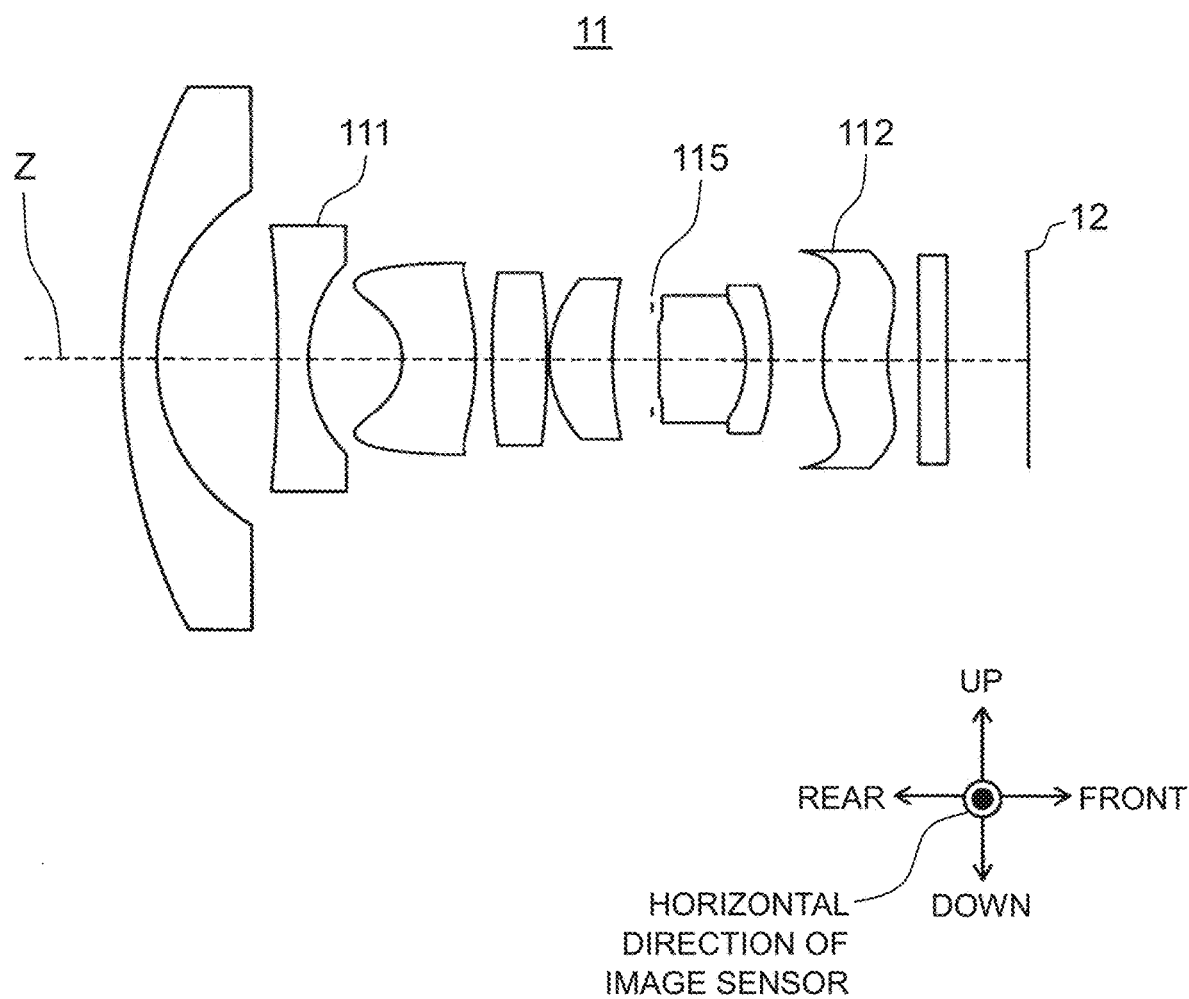
FIG. 8 shows an example of a configuration of an optical system in the imaging device.

FIG. 8 shows an example of a specific configuration of optical system 11. FIG. 8 schematically shows a cross-section when optical system 11 is virtually cut by a vertical plane including optical axis Z (a plane in which a horizontal direction of the image sensor is a normal). Optical axis Z is a virtual line that passes through a center of the imaging surface of image sensor 12 and orthogonally intersects the imaging surface. When optical system 11 includes, for example, a mirror or a prism that reflects light, its optical axis is bent by reflection. As shown in FIG. 8, optical system 11 includes a plurality of lenses and diaphragm 115. In particular, optical system 11 includes free-form lenses 111, 112.

The free-form lens is a lens in which a surface for refracting light to form an image has a non-arc shape and is not rotation symmetry. In the present disclosure, a cylindrical lens is also defined as a type of an arc lens. That is to say, the cylindrical lens is defined as a lens different from the free-form lens in the present disclosure. The free-form lens has the non-arc shape that is not a part of a perfect circle, does not depend on a horizontal axis or a vertical axis, and has a diagonal surface shape that can be freely set. The free-form lens is, for example, a lens represented by an XY polynomial surface. Materials of the free-form lens include, but are not particularly limited to, glass, resin, and the like. Examples of a method of manufacturing; the free-form lens include, but are not particularly limited to, a method of molding the free-form lens using a mold such as a metal mold.

A set of free-form lenses 111. 112 constitutes a lens that can cause the magnification ratio of an image to be formed to vary depending on the view angle. Free-form lenses 111, 112 are designed such that, as shown in part (B) of FIG. 7, in a captured image formed on the imaging surface of image sensor 12 through optical system 11, an image formed in the region at the center part has a large magnification ratio and an image formed in the upper and lower end regions has a small magnification ratio.

Figure 9:
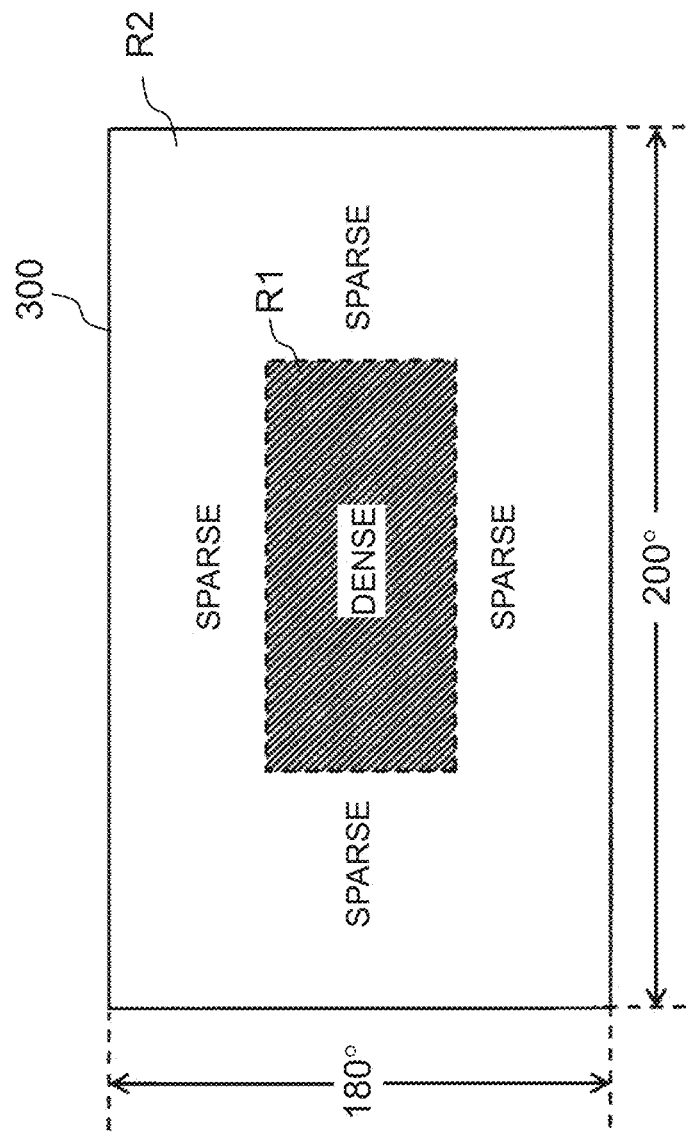
FIG. 9 is an explanatory diagram of a distribution of resolution of an image formed by the optical system of the imaging device.

FIG. 9 shows the resolution of captured image 300 formed on the imaging surface of image sensor 12 by optical system 11. As shown in FIG. 9, in captured image 300, the resolution of an image in region R1 at the center part is high (dense) whereas the resolution of an image in region R2 outside region R1 is low (sparse) as compared to region R1. Optical axis Z of optical system 11 passes through a center of region R1. That is to say, the center of region R1 is an intersection with optical axis Z. The image of region R1 has high resolution, and thus it is possible to increase precision of sensing by using the image of region R1. Optical system 11 is designed such that the resolution changes not intermittently but successively and monotonically in region R1 and region R2.

The image resolution is defined as the number of pixels in image sensor 12 used to capture an image with a unit view angle, the image being formed on image sensor 12 through optical system 11. The resolution is defined by the following formula.

$$\text{Resolution} = \text{number of pixels required to capture image with predetermined view angle/predetermined view angle} \quad (1)$$

Figure 10:
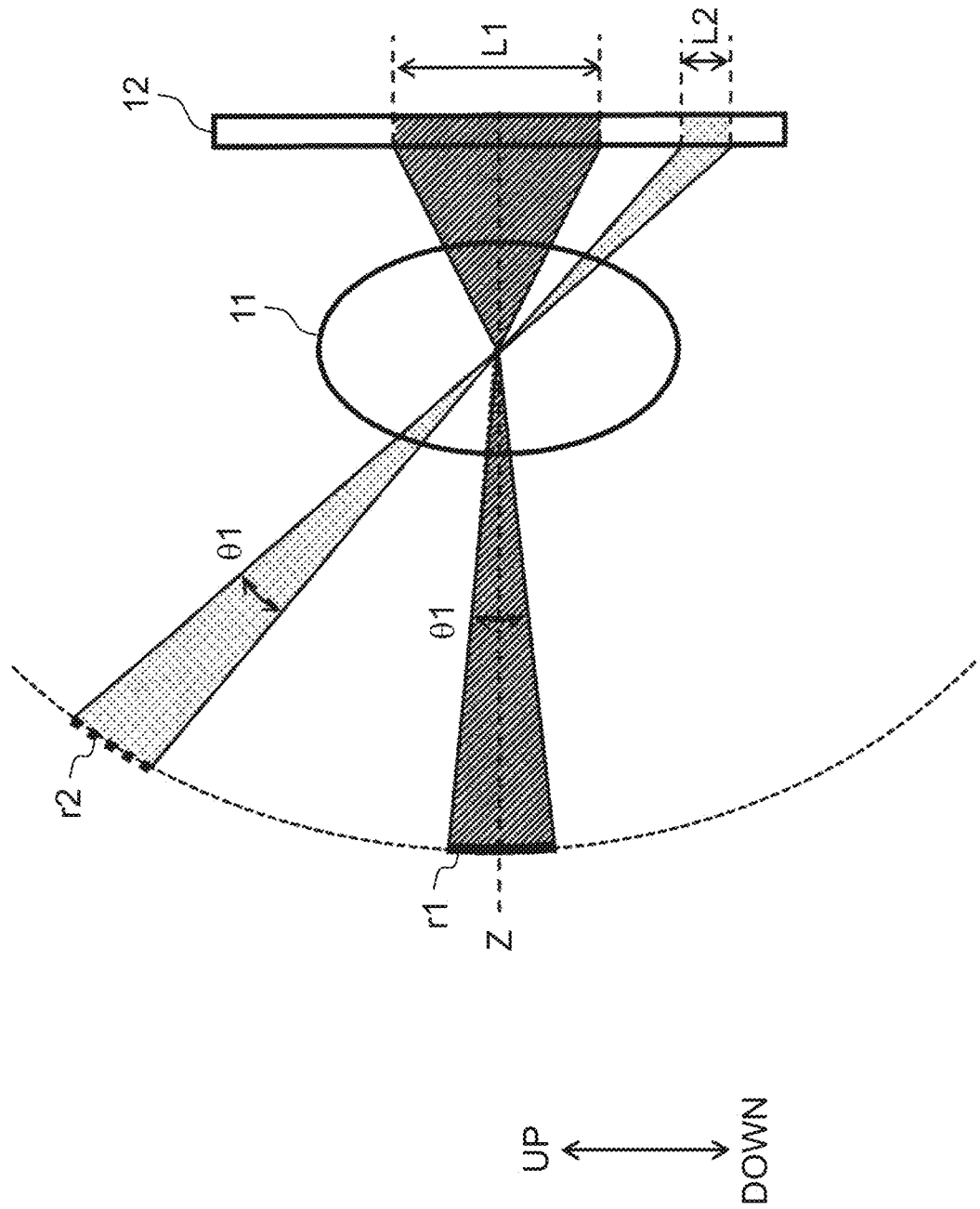
FIG. 10 is an explanatory diagram of the resolution of an image formed on an image sensor by the optical system of the imaging device.

The resolution of an image formed by optical system 11 is specifically described with reference to FIG. 10. FIG. 10 is a schematic explanatory diagram of an imaging state on image sensor 12 when virtually cut by a vertical plane including optical axis Z (a plane orthogonally intersecting a horizontal plane). As shown in FIG. 10, it is considered that a subject image in first region r1 in a range of view angle θx in a vertical direction including optical axis Z and a subject image in second region r2 having identical view angle θx are formed onto image sensor 12 through optical system 11. Region r1 is a part of a subject region corresponding to region R1 in a captured image, and region r2 is a part of the subject region corresponding to region R2 in the captured image.

Optical system 11 is designed such that magnification ratio (M1) of region R1 at the center part is high whereas magnification ratio (M2) of region R2 including upper and lower end portions is low in the captured image. When image sensor 12 captures a subject in first region r1 including optical axis Z through optical system 11, the image in first region r2 is formed on the imaging surface of image sensor 12 while being magnified with magnification ratio M1, as shown in FIG. 10. When image sensor 12 captures a subject in second region r2 apart from optical axis Z, the image is formed on the imaging surface of image sensor 12 while being magnified with magnification ratio M2 that is lower than magnification ratio M1 at the center part. Therefore, length L2 of the image in second region r2 on the imaging surface is less than length L1 of the image in first region r1.

Pixels are two-dimensionally arranged on image sensor 12 at equal intervals. Consequently, as the vertical length of an image increases, the number of pixels required to capture the image also increases. In other words, number N1 of pixels required to capture the image in first region r1 having length L1 is larger than number N2 of pixels required to capture the image in second region r2 having length L2 (<L1). View angle of first region r1 and the view angle of second region r2 are equal (θx). Accordingly, the resolution of the image for first region r1 (=N1/θx) (the number of pixels per unit view angle) is higher than the resolution of the image for second region r2 (=N2/θx).

Figure 11:
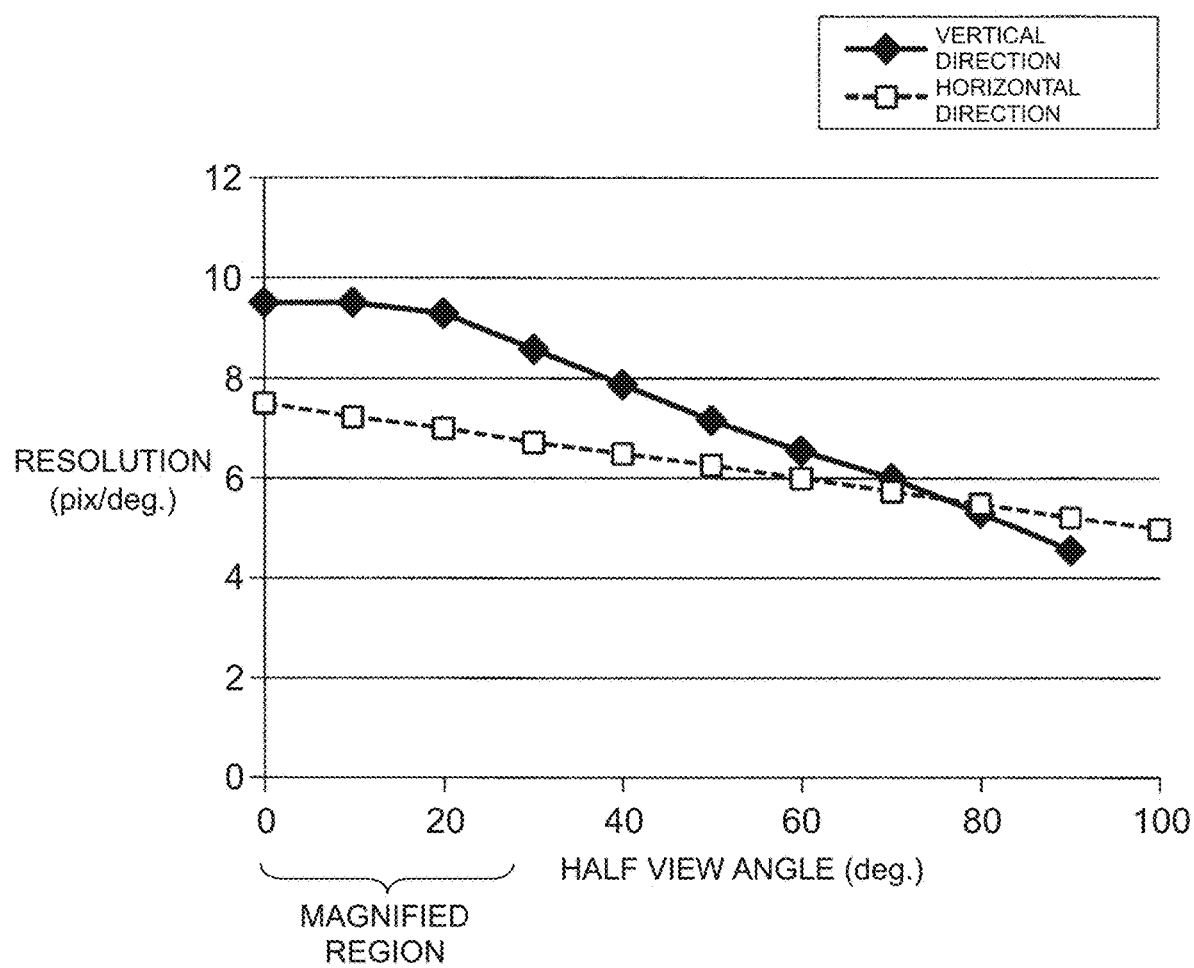
FIG. 11 shows resolution (angle resolution) characteristics of a free-form lens used for the optical system of the imaging device.

FIG. 11 shows resolution (angle resolution) characteristics with respect to a half view angle (a view angle determined by using optical axis Z as a reference) in optical system 11 according to the present exemplary embodiment. FIG. 11 shows the resolution characteristics with respect to a vertical view angle and a horizontal view angle.

As shown in FIG. 11, in the vertical direction, the resolution of a region with a small view angle (for example, with a half view angle ranging from 0° to 25°, both inclusive) is higher than the resolution of a region with a large view angle (for example, with a half view angle of 25° or larger). In the horizontal direction, the resolution of the region with a small view angle (for example, with a half view angle ranging from 0° to 25°, both inclusive) is also higher than the resolution of the region with a large view angle (for example, with a half view angle of 25° or larger).

Free-form lenses 111 and 112 are designed so as to have the optical characteristics described above and the range in which the horizontal view angle and the vertical view angle are from 0° to 50°, both inclusive, is defined as first region R1. In captured image 300 generated by image sensor 12, the resolution of the image formed in region R1 at the center part can thus be higher (that is to say, denser) than the resolution of the image formed in region R2 other than region R1, as shown in FIG. 9.

In the present exemplary embodiment, the relationship between the vertical view angle and the resolution is different from the relationship between the horizontal view angle and the resolution as shown in FIG. 11. That is to say, the resolution characteristics in the vertical direction are different from those in the horizontal direction in the common range of view angle (for example, the range of half view angle from 0° to 90°, both inclusive, in FIG. 11). As optical system 11 is designed so as to have such optical characteristics, the average of the vertical resolution can be higher than the average of the horizontal resolution in a subject image of region R1, for example.

Figure 12:
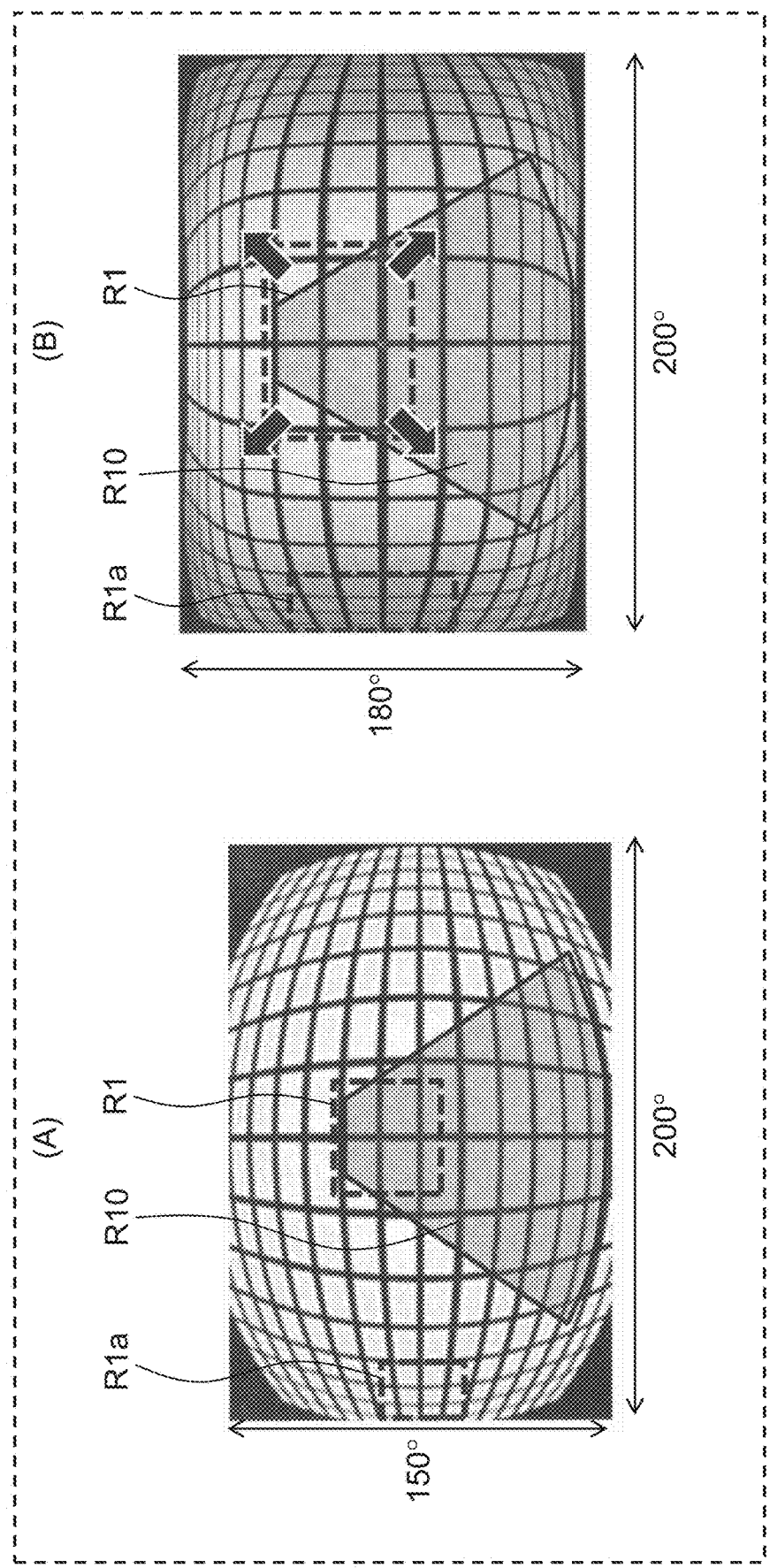
FIG. 12(A) is an explanatory diagram of a view angle and a magnification ratio of a fisheye lens.
FIG. 12(B) is an explanatory diagram of the view angle and the magnification ratio of the optical system including a free-form lens.

FIG. 12 is a comparison explanatory diagram of capturable ranges of view angle for a fisheye lens and for optical system 11 according to the present exemplary embodiment. Part (A) of FIG. 12 is an explanatory diagram of the capturable range of view angle of a fisheye lens. Part (B) of FIG. 12 is an explanatory diagram of the capturable range of view angle of optical system 11 including a free-form lens according to the present exemplary embodiment. Region R10 indicates a region particularly required for sensing behind a vehicle.

As shown in part (A) of FIG. 12, the resolution of region R1 at the center part can be higher than that of peripheral region R1a in the fisheye lens. The view angle of the fisheye lens is limited by an aspect ratio of an image sensor, however. For example, when the aspect ratio (H:V) of the image sensor is 4:3 and the horizontal view angle is 200°, the vertical view angle is limited to 150°. It is thus impossible to capture a subject in a region with a vertical view angle larger than 150°. Additionally, in central region R1 where a far-off subject is possibly captured behind the vehicle, when the size of the subject is still small, the subject cannot be magnified any more. As a result, the precision of sensing region R1 is degraded.

Meanwhile, optical system 11 according to the present exemplary embodiment includes a free-form lens. The horizontal view angle and the vertical view angle are thus set independently. For this reason, the horizontal view angle can be set to 200° and the vertical view angle can be set to 180° larger than 150° without being limited by the aspect ratio of the image sensor, as shown in part (B) of FIG. 12. It is thus possible to capture a subject with a wider range of view angle.

As optical system 11 includes the free-form lens, a magnification ratio can be freely set based on the view angle. The magnification ratio of region R1 where a far-off subject is possibly captured behind the vehicle can thus be larger than that of other regions. Additionally, the magnification ratio can be set independently for each of the vertical and horizontal view angles. For example, if the vertical view angle is increased., the magnification ratio in the vertical direction is reduced as a whole. In part (B) of FIG. 12, however, not only the vertical view angle can be increased as a whole but also the average magnification ratio of region R1 in the vertical direction can be increased more than that of other regions. It is thus possible to increase the precision of sensing region R1. The magnification ratio of optical system 11 in the horizontal direction can be kept so that the resolution of peripheral region R1a is kept. It is thus possible to keep the precision of sensing in a desired region.

Note that, an expression of different resolution in this exemplary embodiment means a difference in resolution, which is generated by a combination of an optical system (for example, an optical system including an ordinary rotationally symmetric spherical lens and an aspherical lens) and a planer image sensor.

As described above, optical system 11 (free-form lenses 111, 112) according to the present exemplary embodiment can form an image in which the resolution (that is to say, magnification ratio) of view angle of the center part is higher than the resolution of a peripheral part. It is thus possible to obtain an image that has high resolution in the region at the center part, which is important for sensing, while a wide view angle is achieved as a whole. In a common range of view angle, the relationship between the vertical view angle and the resolution is different from the relationship between the horizontal view angle and the resolution in the present exemplary embodiment. It is thus possible to independently set the vertical size and the horizontal size of a region with high resolution. In addition, the location and shape of the region with high resolution can be set freely.

[1-2. Operation]

Operations of imaging device 10 and control device 20 configured as described above will be described below.

Imaging device 10 captures an image behind vehicle 100 while vehicle 100 is standing or reversing, generates image data, and transmits the image data to control device 20.

Control device 20 receives the image data via first interface 23. Controller 21 of control device 20 performs predetermined image processing on the image data received and generates image data for display. Controller 21 transmits the image data for display via second interface 25 to display 30. Display 30 displays an image based on the image data received from control device 20, A driver of vehicle 100 checks the image displayed on display 30, thus grasping the situation behind the vehicle (for example, whether a child is present behind the vehicle).

Controller 21 of control device 20 also performs image analysis (sensing) on the image data received from imaging device 10 to acquire various information about the situation behind vehicle 100. For example, controller 21 can determine whether a person is present behind the vehicle through image analysis (face detection). That is to say, when a person is present behind the vehicle, controller 21 can output a predetermined signal. Controller 21 can also determine whether an obstacle is present behind the vehicle through image analysis. That is to say, when an obstacle is present behind the vehicle, controller 21 can output a predetermined signal. Controller 21 generates a control signal of control target 60 based on a result of image analysis and transmits the control signal via the third interface to control target 60. Control target 60 is thus controlled based on the situation behind the vehicle. Examples of control target 60 include a brake, an accelerator, and an alarm.

For example, when is detected during reversing of vehicle 100 that a person or an obstacle is present behind the vehicle by performing image analysis on the image data received from imaging device 10, controller 21 may control a brake of vehicle 100 to stop reversing vehicle 100. Alternatively, when it is detected before the start of reversing of the vehicle that a person or an obstacle is present behind the vehicle, controller 21 may control an accelerator and the brake so as not to start to reverse vehicle 100. Alternatively, when it is detected that a person or an obstacle is present behind the vehicle, controller 21 may control an alarm to output an alarm sound or an alarm message to the person or the obstacle which is detected.

Imaging device 10 according to the present exemplary embodiment has a wide view angle in the vertical direction, and thus if a person is present behind vehicle 100 at a close distance as shown in FIG. 5, it is possible to capture an image including the upper part of the person (that is to say, a part including the face) as shown in part (B) of FIG. 7. Controller 21 can thus detect the person more reliably using face detection through image analysis. Additionally, imaging device 10 according to the present exemplary embodiment can generate an image that has high resolution in the center part of a capturing range, which is important for sensing. If a small child is present in the central region of the capturing range behind the vehicle, for example, the child is captured while being magnified and thus it is possible to obtain image data that is sufficient in size for image analysis. Consequently, it is possible to recognize even a small child. Moreover, in imaging device 10 according to the present exemplary embodiment, if the vertical view angle is increased, the vertical magnification ratio of the image in the important center part can be further increased. It is thus possible to capture even a small child, which is a target, with high resolution and recognize the small child more reliably.

As described above, imaging device 10 according to the present exemplary embodiment can perform capturing with a wide range of view angle and capture an image of a subject in the center part of the capturing range with high resolution. It is thus possible to increase the precision of image analysis using a captured image.

[1-3. Effects and Others]

As described above, imaging device 10 according to the present exemplary embodiment includes image sensor 12 that has an imaging surface on which a plurality of pixels are two-dimensionally arranged and that generates image data from a subject image formed on the imaging surface and optical system 11 that images a subject in a predetermined range of vertical view angle and in a predetermined range of horizontal view angle on the imaging surface of image sensor 12. The number of pixels used for capturing a subject image included in a unit view angle is defined as resolution. The imaging surface includes a first region (for example, region R1 shown in FIG. 9) including an intersection with optical axis Z and a second region different from the first region (for example, region R2 shown in FIG. 9). Optical system 11 forms a subject image on the imaging surface so that resolution of first region R1 is higher than resolution of second region R2. The relationship between the vertical view angle and the resolution is different from the relationship between the horizontal view angle and the resolution in the subject image formed on the imaging surface.

With the configuration described above, in a captured image, the resolution of a region at the center part can be higher than the resolution of a region at a peripheral part. It is thus possible to capture an image that has high resolution in the center part required for sensing or the like while a wide view angle is achieved as a whole. It is thus possible to improve the precision of analysis of the captured image.

Additionally, vertical resolution characteristics and horizontal resolution characteristics of the subject image formed on the imaging surface vary independently, and thus it is possible to freely set the horizontal view angle and the vertical view angle of the optical system regardless of the aspect ratio of image sensor 12. That is to say, the ratio of the vertical view angle to the horizontal view angle for optical system 11 does not need to correspond to the aspect ratio of the imaging surface. It is thus possible to freely set the view angle.

In an image formed in first region R1 of the imaging surface, the average vertical resolution is higher than the average horizontal resolution. It is thus possible to obtain an image that is more magnified in the vertical direction in first region R1. This image is useful for detecting a subject extending in the vertical direction, for example. By intentionally reducing the horizontal resolution to be less than the vertical resolution, it is possible to keep the vertical resolution of peripheral region R1a far away from vehicle 100, thus keeping the precision of sensing (see FIG. 12).

Optical system 11 includes free-form lenses 111, 112. It is thus possible to freely design the magnification ratio that varies based on the view angle in the optical system. As free-form lenses 111, 112 are used, the resolution can asymmetrically vary with respect both a horizontal axis and a vertical axis of the imaging surface. Moreover, as free-form lenses 111, 112 are used, the shape of these lenses does not depend on the horizontal axis or the vertical axis and the shape of a surface in a diagonal direction is freely set. It is thus possible to freely set the resolution of the imaging surface in the diagonal direction (a region other than a region on the vertical axis and the horizontal axis).

Imaging device 10 may be mounted on the rear of vehicle 100 to capture a subject behind vehicle 100. For example, imaging device 10 is used for checking safety when the vehicle reverses.

Imaging device 10 and display 30 that displays an image based on image data generated by imaging device 10 may constitute a display system.

Imaging device 10 and control device 20 that analyzes image data generated by the imaging device may constitute an imaging system.

(Second Exemplary Embodiment)

Optical system 11 is configured by including free-form lens for the purpose of obtaining a captured image that has high resolution in a central region and low resolution in a peripheral region in the first exemplary embodiment. However, it is not necessary to configure optical system 11 using the free-form lens. The captured image can be achieved by modifying a pixel distribution of image sensor 12b with an ordinary rotationally symmetric optical system. A configuration of imaging device 10b that includes an optical system without a free-form lens will be described below.

Figure 13:
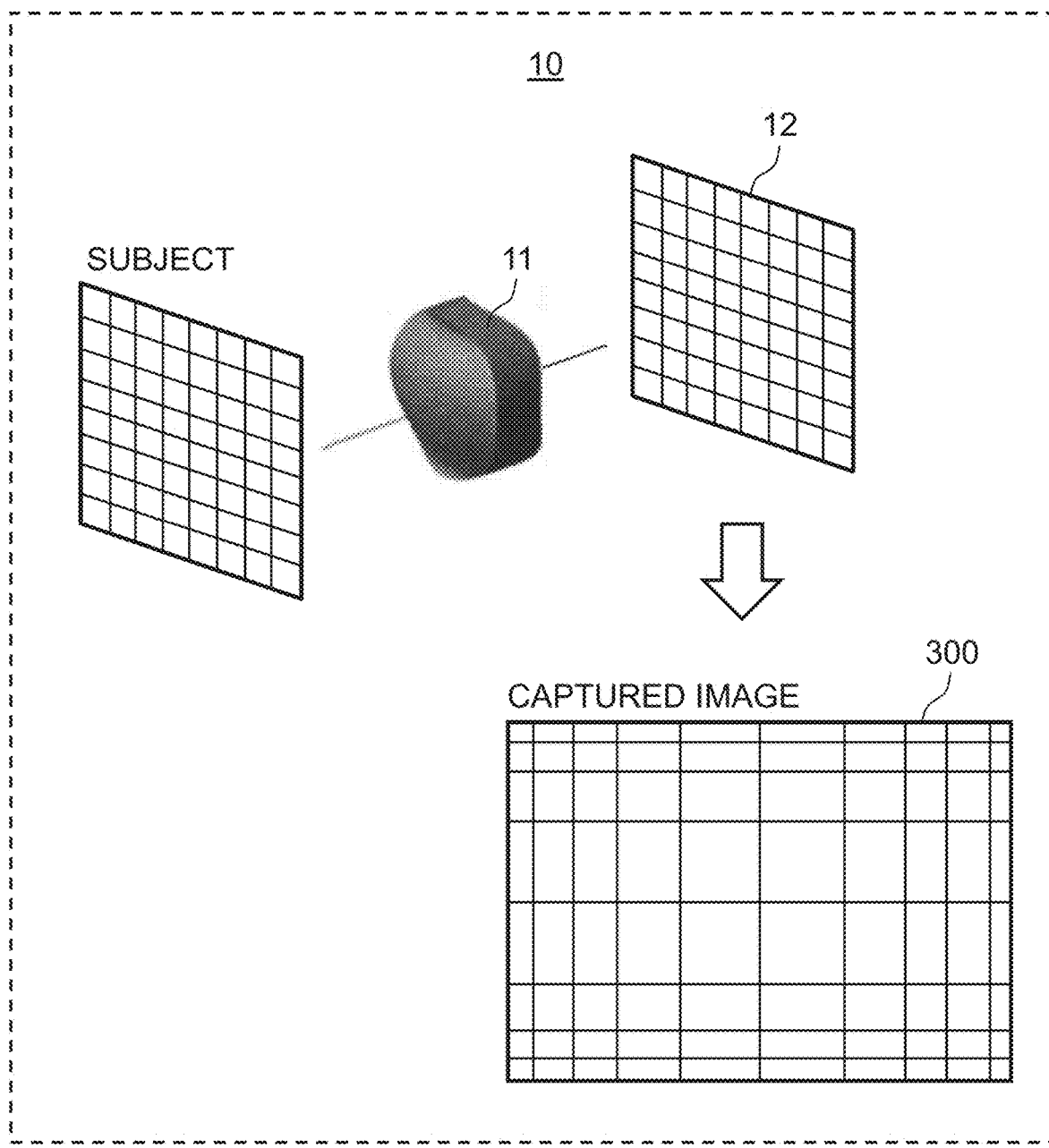
FIG. 13 is an explanatory diagram of the optical system and the image sensor in the imaging device according to the first exemplary embodiment and of a captured image formed by the optical system and the image sensor.
Figure 14:
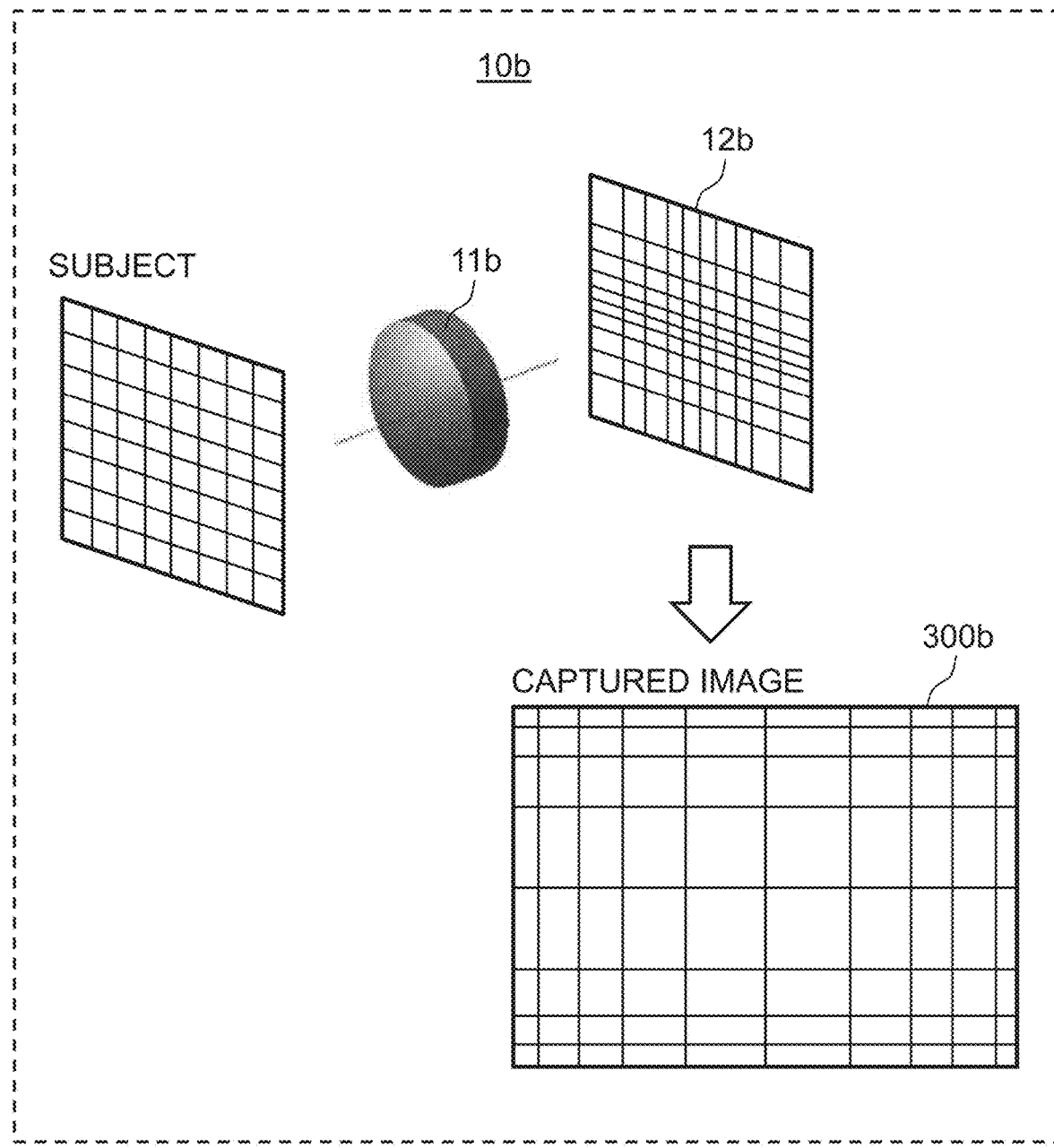
FIG. 14 is an explanatory diagram of an optical system and an image sensor in an imaging device according to a second exemplary embodiment and of a captured image formed by the optical system and the image sensor.

FIG. 13 is an explanatory diagram of a pixel distribution of image sensor 12 in imaging device 10 according to the first exemplary embodiment and of a resolution distribution of captured image 300 captured by a combination of optical system 11 and image sensor 12. FIG. 14 is an explanatory diagram of a pixel distribution of image sensor 12b in imaging device 10b according to the second exemplary embodiment and of a resolution distribution of captured image 300b captured by a combination of optical system 11b and image sensor 12b.

As shown in FIG. 13, a plurality of pixels are two-dimensionally arranged on an imaging surface of image sensor 12 at equal intervals in the first exemplary embodiment. An image that has high resolution in the central region and low resolution in the peripheral region is formed on the imaging surface of image sensor 12 by using free-form lenses 111, 112 of optical system 11. It is thus possible to obtain captured image 300 whose resolution is high in the center part and becomes lower toward the peripheral edge. As optical system 11 uses free-form lenses 111, 112, an image is formed on the imaging surface so that the relationship between the vertical view angle and the resolution is different from the relationship between the horizontal view angle and the resolution. As a result, it is possible to freely set the location, shape, and size of a region that is important for sensing.

Meanwhile, in the present exemplary embodiment, imaging device 10b includes optical system 11b that is a rotationally symmetric lens and image sensor 12b with a specific pixel distribution.

Figure 15:
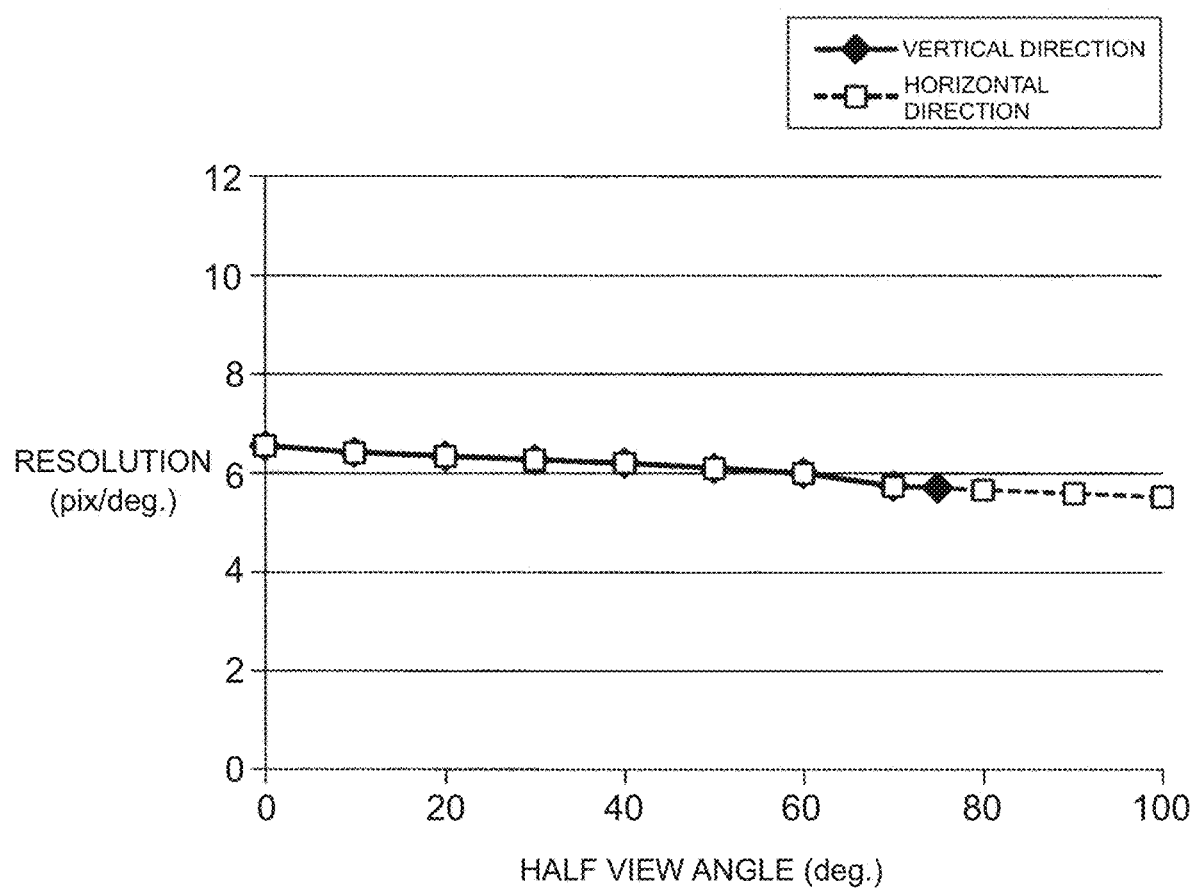
FIG. 15 shows resolution (angle resolution) characteristics of the optical system in the imaging device according to the second exemplary embodiment.

That is to say, optical system 11b according to the second exemplary embodiment is a lens that has resolution (angle resolution) characteristics shown in FIG. 15 with respect to vertical resolution and horizontal resolution when an image is formed on an image sensor with a uniform pixel distribution. That is to say, optical system 11b is configured such that in the range of view angle that is common to the vertical direction and the horizontal direction (for example, in a range of half view angle from 0° to 75°, both inclusive, in FIG. 15), the relationship between the vertical view angle and the resolution (that is to say, magnification ratio) is the same as the relationship between the horizontal view angle and the resolution (that is to say, magnification ratio).

Figure 16:
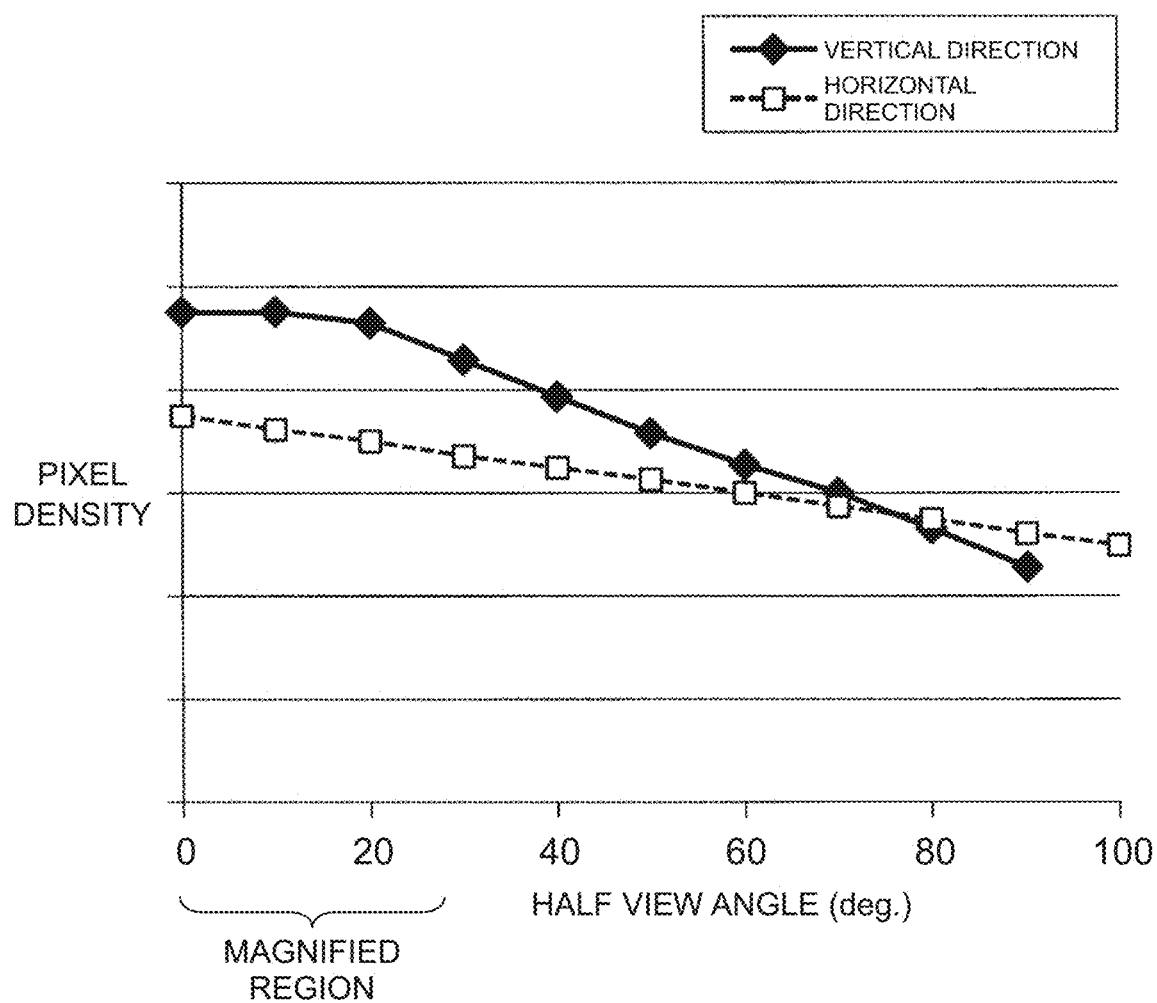
FIG. 16 shows a pixel density with respect to a view angle of the image sensor in the imaging device according to the second exemplary embodiment.

Meanwhile, as shown in FIG. 16, image sensor 12b according to the second exemplary embodiment has such a pixel distribution that the center part (the part corresponding to region R1) has high pixel density and the region other than region R1 (the part corresponding to region R2) has low pixel density. Moreover, image sensor 12b is set such that in the range of view angle that is common to the vertical direction and the horizontal direction (for example, in a range of half view angle from 0° to 90°, both inclusive, in FIG. 16), the relationship between the vertical view angle and the pixel density is different from the relationship between the horizontal view angle and the pixel density.

By using the combination of optical system 11b and image sensor 12b described above, it is possible to obtain captured image 300b that has high resolution in region R1 at the center part and low resolution in region R2 other than region R1, as in the first exemplary embodiment.

As described above, imaging device 10b according to the present exemplary embodiment includes image sensor 12b that has an imaging surface on which a plurality of pixels are two-dimensionally arranged and that generates image data from a subject image formed on the imaging surface and optical system 11b that images a subject in a predetermined range of vertical view angle and in a predetermined range of horizontal view angle on the imaging surface of image sensor 12b. The imaging surface includes a first region (for example, a region corresponding to region R1) including an intersection with an optical axis and a second region different from the first region (for example, a region corresponding to region R2). The imaging surface has such a pixel distribution that the pixel density of the first region is higher than the pixel density of the second region. In addition, the imaging surface is set such that the vertical pixel density is different from the horizontal pixel density.

With the configuration described above, the resolution of region R1 at the center part in a captured image can be higher than the resolution of region R2 other than region R1, as in the first exemplary embodiment. It is thus possible to capture an image that has high resolution in the center part required for sensing or the like while a wide view angle is achieved as a whole. It is thus possible to improve the precision of analysis of the captured image. Additionally, as the vertical resolution characteristics of an image formed on the imaging surface are different from the horizontal resolution characteristics thereof, it is possible to freely set the horizontal view angle and the vertical view angle of the optical system regardless of the aspect ratio of image sensor 12b. That is to say, as in the first exemplary embodiment, the ratio of the vertical view angle to the horizontal view angle does not need to correspond to the aspect ratio of the imaging surface. It is thus possible to increase the whole view angle regardless of the resolution of a region that is important for sensing.

As in the first exemplary embodiment, the average of the vertical resolution of a first subject image of a subject image, which is formed in the first region, may be higher than the average of the horizontal resolution of the first subject image. It is thus possible to obtain an image that is more magnified in the vertical direction in first region R1, for example. This image is useful for detecting a subject extending in the vertical direction, for example.

As in the first exemplary embodiment, imaging device 10b may be mounted on the rear of vehicle 100 to capture a subject behind vehicle 100. For example, imaging device 10b is used for checking safety when the vehicle reverses.

As in the first exemplary embodiment, imaging device 10b and display 30 that displays an image based on image data generated by imaging device 10b may constitute a display system.

As in the first exemplary embodiment, imaging device 10b and control device 20 that analyzes image data generated by the imaging device may constitute an imaging system.

(Other Exemplary Embodiments)

The first and second exemplary embodiments have been described above as examples of the technique disclosed in the present application. However, the technique according to the present disclosure is not limited to the first and second exemplary embodiments, but is applicable to other exemplary embodiments including appropriate modifications, replacements, additions, omissions, and the like. In addition, new exemplary embodiments can be made by combining constituent elements described in the first and second exemplary embodiments. Hence, other exemplary embodiments are described below.

In the exemplary embodiments described above, the electronic room mirror and the in-vehicle display are exemplified as the display. However, the type of the display is not limited to these electronic room mirror and in-vehicle display. An idea of the present disclosure can be adapted to display systems that use various types of displays according to uses (for example, a head-up display).

While imaging devices 10, 10b are disposed to capture a scene behind the vehicle in the exemplary embodiments described above, imaging devices 10, 10b may be disposed to capture a front scene or a side scene of the vehicle.

While imaging devices 10, 10b perform the gamma correction and the distortion correction on images in the exemplary embodiments described above, control device 20 may perform these processing. Alternatively, imaging devices 10, 10b may perform the gamma correction, and control device 20 may perform the distortion correction.

While vehicle 100 of an automobile has been described as an example of a moving body in the exemplary embodiments described above, the moving body is not limited to the automobile. The imaging device according to the exemplary embodiments described above may be used for other moving bodies including a railway vehicle, a vessel, an airplane, a robot, a robot arm, a drone, an agricultural machine such as a combine, and a construction machine such as a crane. The imaging device may also be used for a monitoring camera.

The view angle, the resolution and the like described in the exemplary embodiments are only examples and may be appropriately set based on a target (an object or an event) to be subjected to image analysis.

While the optical system is configured by including the free-form lens in the first exemplary embodiment described above, other types of lens whose magnification ratio (that is, resolution) can be freely designed according to a view angle may be used instead of the free-form lens.

The exemplary embodiments have been described as examples of the technique in the present disclosure. The accompanying drawings and the detailed description have been provided for this purpose.

Accordingly, the constituent elements described in the accompanying drawings and the detailed description may not only include constituent elements that are essential for solving the problems, but may also include constituent elements that are not essential for solving the problems in order to illustrate the technique. It should not be therefore determined that the unessential constituent elements in the accompanying drawings and the detailed description are essential only based on the fact that these constituent elements are included in the drawings and the description.

The above exemplary embodiments are provided to exemplify the technique according to the present disclosure, and thus various changes, replacements, additions, omissions, and the like can be made within the scope of the claims and equivalents thereof.

According to the system of the present disclosure, one imaging device can provide images with a plurality of view angles including a high resolution image, and the system is applicable to various uses (an imaging system or a display system in a moving body, or the like).

What is claimed is:

1. An imaging device comprising:
an image sensor that includes an imaging surface on which a plurality of pixels are two-dimensionally arranged at equal intervals and that generates image data from a subject image formed on the imaging surface; and
an optical system that images a subject on the imaging surface, the subject being in a predetermined range of a vertical view angle and in a predetermined range of a horizontal view angle, wherein:
a number of pixels used for capturing the subject image included in a unit view angle is defined as resolution,
the imaging surface includes a first region including an intersection with an optical axis and a second region different from the first region,
the optical system forms the subject image on the imaging surface so as to cause resolution of the first region to be higher than resolution of the second region, and
a relationship between a vertical view angle and resolution is different from a relationship between a horizontal view angle and resolution in the subject image.

2. The imaging device according to claim 1, wherein the optical system includes a free-form lens.

3. The imaging device according to claim 1, wherein in a first subject image of the subject image an average of vertical resolution is higher than an average of horizontal resolution, the first subject being formed in the first region.

4. The imaging device according to claim 1 being mounted to rear of a moving body to capture the subject behind the moving body.

5. The imaging device according to claim 4, wherein the moving body is an automobile, a railway vehicle, a vessel, an airplane, a robot, a robot arm, a drone, an agricultural machine, or a construction machine.

6. The imaging device according to claim 1, wherein in the optical system, a ratio of the vertical view angle to the horizontal view angle does not correspond to an aspect ratio of the imaging surface.

7. A display system comprising:
the imaging device according to claim 1; and
a display that displays an image based on the image data generated by the imaging device.

8. An imaging system comprising:
the imaging device according to claim 1; and
a control device that analyzes the image data generated by the imaging device.

9. The imaging device according to claim 1, wherein
the optical system is configured to form the subject image on the imaging surface so that, (1) when compared with a second optical system having a predetermined vertical view angle with a uniform magnification in the vertical direction and (2) when the optical system maintains the predetermined vertical view angle:
the resolution of the first region in the optical system is larger than in the second optical system; and
the resolution of the second area located at the upper and lower portions of the first area in the optical system is lower than in the second optical system.

* * * * *